(12) United States Patent
Zheng et al.

(10) Patent No.: US 7,812,092 B2
(45) Date of Patent: Oct. 12, 2010

(54) HAIRY POLYMERIC NANOPARTICLES

(75) Inventors: Lei Zheng, Apex, NC (US); Eric Sean Castner, Uniontown, OH (US); Thierry Florent Edme Materne, Lasne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 351 days.

(21) Appl. No.: 12/157,237

(22) Filed: Jun. 10, 2008

(65) Prior Publication Data

US 2008/0242813 A1 Oct. 2, 2008

Related U.S. Application Data

(62) Division of application No. 11/072,986, filed on Mar. 5, 2005, now Pat. No. 7,408,005.

(51) Int. Cl.
*C08F 279/02* (2006.01)
(52) U.S. Cl. .............................. 525/70; 525/86; 525/87; 525/243; 525/271; 525/326.1; 525/331.9; 525/332.2; 525/333.3
(58) Field of Classification Search .................. 525/70, 525/86, 87, 243, 271, 326.1, 331.9, 332.2, 525/333.3
See application file for complete search history.

(56) References Cited

U.S. PATENT DOCUMENTS

| | | | |
|---|---|---|---|
| 4,695,607 A | 9/1987 | Spinelli | 525/272 |
| 5,395,891 A | 3/1995 | Obrecht et al. | 525/194 |
| 5,585,441 A | 12/1996 | Brandes et al. | 525/193 |
| 6,127,488 A | 10/2000 | Obrecht et al. | 525/333.3 |
| 6,133,364 A | 10/2000 | Obrecht et al. | 524/495 |
| 6,207,757 B1 | 3/2001 | Obrecht et al. | 525/194 |
| 6,242,534 B1 | 6/2001 | Obrecht et al. | 525/194 |
| 6,437,050 B1 | 8/2002 | Konno et al. | 525/313 |
| 6,653,404 B2 | 11/2003 | Konno et al. | 525/84 |
| 6,747,095 B2 | 6/2004 | Konno et al. | 525/89 |
| 6,777,500 B2 | 8/2004 | Lean et al. | 525/316 |
| 6,956,084 B2 | 10/2005 | Wang et al. | 428/401 |
| 7,344,752 B2 | 3/2008 | Zheng et al. | 427/213.3 |
| 2003/0198810 A1 | 10/2003 | Wang et al. | 428/401 |
| 2006/0114150 A1 | 6/2006 | Van Diggelen | 342/357.02 |

OTHER PUBLICATIONS

Bi and Fetters, "Synthesis and Properties of Block Copolymers 3. Polystyrene Polydiene Star Block Copolymers" Macromolecules, vol. 9, Issue 5, pp. 732-742 (1976).
Szakacs et al., STN AN 1978: 191563 (1984).
File Registry of STN, entry for RN501-60-0 (1984), no author.

*Primary Examiner*—Jeffrey C Mullis
(74) *Attorney, Agent, or Firm*—Alvin T. Rockhill

(57) ABSTRACT

This invention discloses a process for synthesizing a hairy polymer particle which comprises the steps of (1) polymerizing a vinyl aromatic monomer by emulsion polymerization in an aqueous medium to produce core particles, (2) recovering the core particles from the aqueous medium, (3) dispersing the core particles in an organic solvent, (4) adding an organo-lithium compound to the dried core particles in the organic solvent to produce the hairless core initiator, and (5) utilizing the hairless core initiator to initiate the anionic polymerization of a conjugated diolefin monomer in an organic solvent to produce a solution of the hairy polymer particles. The hairy polymer nanoparticles can then be recovered from the organic solvent. These hairy polymer particles are comprised of (1) a core which is comprised of a polymer of a vinyl aromatic monomer and (2) hairs which are polymer chains of a conjugated diolefin monomer, wherein the hairs are covalently bonded to the core. The core is typically spherical in shape, has a diameter of less than 1000 nm, and is comprised of a crosslinked polymer of a vinyl aromatic monomer. The hairy polymer particles of this invention are useful as fillers in rubber compositions used in making articles of manufacture, such as tires, hoses, power transmission belts, windshield wiper blades, and the like.

20 Claims, 2 Drawing Sheets

HAIRY POLYMERIC NANOPARTICLES

This application is a divisional of U.S. patent application Ser. No. 11/072,986, filed on Mar. 5, 2005, which claims the benefit of U.S. Provisional Patent Application Ser. No. 60/552,617, filed on Mar. 12, 2004. The teachings of U.S. patent application Ser. No. 11/072,986 and U.S. Provisional Patent Application Ser. No. 60/552,617 are incorporated herein by reference in their entirety.

BACKGROUND OF THE INVENTION

Particles of various types are commonly incorporated into rubber compositions as fillers. For instance fillers are typically included in the rubber compositions utilized in manufacturing tires, hoses, belts, windshield wiper blades, floor mats, and other rubber products. The fillers are chosen to enhance certain physical characteristics of the rubber composition. The use of carbon black, silica, and crosslinked polymers as fillers, is well known in the art of rubber compounding. The addition of fillers tends to improve the physical properties of the polymer matrices to which they are added. Some specific physical properties that are improved by the addition of fillers are tensile strength and abrasion resistance. For instance, the inclusion of fillers in tire tread rubber compounds is critical to attain required strength and tread wear characteristics.

The use of rigid polymer particles to enhance the properties of rubbery materials has been explored by numerous researchers. Early work by Kraus et al, "Dynamic Properties of a Model Reinforced Elastomer. Styrene-Butadiene Reinforced with Polystyrene" in Macromolecules, Vol. 3, Issue 1, pages 92-96 (1970) studied the properties of 40 nm polystyrene particles reinforced SBR rubber. Morton et al also examined similar systems in the article titled "Mechanism of Reinforcement of Elastomers by Polymeric Fillers" in Advanced Chemistry Series, No. 99, pages 490-509 (1971). Recently, Cai et al reported in the Journal of Materials Science, 34, pages 4719-4726 (1999) that crosslinked polystyrene particles in polysulfide rubber gave improved modulus, fracture strength and elongation at break. However, in all these studies, the particles had limited interaction at the interface between the particles and matrix which resulted in physical properties that were only marginally improved.

U.S. Pat. No. 5,395,891 and U.S. Pat. No. 6,127,488 to Obrecht disclose the use of crosslinked polybutadiene and crosslinked styrene-butadiene copolymers, respectively, as fillers. The purported benefits of the inclusion of these crosslinked rubber particles in rubber formulations is lower hysteresis while the polybutadiene gels also impart improved abrasion resistance and styrene-butadiene copolymer gels offer improve wet traction characteristics. U.S. Pat. No. 6,133,364, U.S. Pat. No. 6,207,757, and U.S. Pat. No. 6,242,534 to Obrecht et al disclose a rubber composition comprising a crosslinked elastomer particle and a non-crosslinked elastomer. The crosslinked elastomeric particles are functionalized to impart unique surface reactivity for improved coupling with the non-crosslinked host elastomer as well as the subsequent ability to employ coupling agents other than the conventional sulfur-bridged bis-alkoxy silanes. The benefits of these gels in tire tread compositions are reported to be lower hysteresis, improved abrasion resistance, and improved wet traction.

U.S. Pat. No. 6,747,095 and U.S. Pat. No. 6,653,404 to Konno et al disclose a rubber composition comprising as essential components a crosslinked polymer particle and a non-crosslinked rubber component. The rubber composition may be used to obtain a vulcanized rubber. The crosslinked polymer particles are intended for use as filler to provide a rubber composition having good processability and handling performance as well as improved tensile strength and wear resistance when vulcanized. However, it has been found that the particles disclosed in the Konno et al. application tend to soften at higher service temperatures. The effectiveness of the particles as reinforcing fillers is therefore decreased.

U.S. Pat. No. 6,437,050 to Krom et al disclosed a polymer nanoparticle composition wherein the core is a poly(alkenylbenzene) and the surface layer includes a poly(conjugated diene). The particle is a star polymer with all the diblock copolymer chains attached to one crosslinking center. An article from Fetter and Bi titled "Synthesis and Properties of Block Copolymers 3. Polystyrene Polydiene Star Block Copolymers" in Macromolecules, Vol. 9, Issue 5, pages 732-742 (1976) also studied and reported on the identical system. These particles do not have well-defined center particles. The polystyrene domains are formed from phase separation of diblock copolymers. It lacks dimension stability at higher service temperature above the glass transition temperature of polystyrene.

Nanoparticles are currently receiving significant interest as fillers in rubber compositions. Such combinations often provide dimensions and physical properties that differ from those of the bulk material. The use of nanoparticles as fillers is thought to be advantageous because the discrete particles may be more easily and better dispersed in the polymer matrix. The higher surface to volume ratio of the nanoparticles provides a better opportunity for chemical and physical interactions with the polymer matrix.

SUMMARY OF THE INVENTION

The present invention is the result of the discovery that polymer brushes(hairs) on a polymer particle can be prepared by an anionic polymerization technique from aromatic vinyl monomers and conjugated diene monomers, and the resulting polymer nanoparticles provide a controlled structure, size, and morphology which are very useful, for example, as fillers to enhance the properties of elastomeric polymers. The brushes on the particles can be used to control interface properties and to make the particles compatible or incompatible with a rubber matrix. For example, if the hairs are miscible with the polymer matrix, or host polymer, the particles can be ultimately dispersed. If the brushes are incompatible with the matrix, the particles can aggregate and form higher ordered structure. The ability to change the structures of a particle dispersion from point fillers to aggregated structures systematically through modification of hairs (brushes) can be advantageous in attaining desired mechanical properties.

The particle centers and the brushes can be varied depending upon the desired properties and use of the hairy polymer particles. The particle centers and brushes can be a soft or hard polymeric composition. The brushes are grafted to the center particles through covalent bonds. The volume fraction and grafting density of the brushes can be varied depending upon the desired final properties of the hairy particles. The brush composition can be chosen to provide compatibility or incompatibility with the matrix composition. The particle centers can comprise a crosslinked particle center where it has a predetermined glass transition temperature ($T_g$) such that the crosslinked polymer particle does not soften at service temperatures up to about 150° C.

The particle centers are synthesized by emulsion polymerization which can be a batch, semi-batch, or continuous process, but which provides excellent control of the polymer composition and morphology. The particle brushes are synthesized by anionic polymerization technique. For example, butyllithium initiated polymerization of conjugated diolefin monomers, such as 1,3-butadiene, or vinyl aromatic monomers, such as styrene monomer, with or without modifiers. The initial step can involve the metallation of particles using a combination of initiators for anionic polymerization, such as butyllithium, and a polar modified, such as N,N,N',N'-tetramethylethylene diamine (TMEDA). The process produces hairy particles having a mean average diameter of less than 1000 nm, preferably less than about 100 nm. The hairy particles are useful as fillers in elastomeric compositions and the hairy particles of the present invention provide enhanced properties for such polymeric compositions.

The subject invention more specifically discloses a hairy polymer particle which is comprised of (1) a core which is comprised of a polymer of a vinyl aromatic monomer and (2) hairs which are polymer chains of a conjugated diolefin monomer, wherein the hairs are covalently bonded to the core.

The present invention also reveals a process for synthesizing a hairless core initiator which comprises the steps of (1) polymerizing a vinyl aromatic monomer by emulsion polymerization in an aqueous medium to produce core particles, (2) recovering the core particles from the aqueous medium, (3) drying the core particles to produce dried core particles, (4) dispersing the dried core particles in an organic solvent, (5) adding an organo-lithium compound to the dried core particles in the organic solvent to produce the hairless core initiator.

The subject invention further discloses a process for synthesizing a hairy polymer particle which comprises polymerizing a conjugated diolefin monomer by anionic polymerization in an organic solvent, wherein the anionic polymerization is initiated with the hairless core initiator, wherein the hairless core initiator is synthesized by the steps of (1) polymerizing a vinyl aromatic monomer by emulsion polymerization in an aqueous medium to produce core particles, (2) recovering the core particles from the aqueous medium, (3) drying the core particles to produce dried core particles, (4) dispersing the dried core particles in an organic solvent, (5) adding an organo-lithium compound to the dried core particles in the organic solvent to produce the hairless core initiator.

The subject invention also discloses a process for synthesizing a hairy polymer particle which comprises the steps of (1) polymerizing a vinyl aromatic monomer by emulsion polymerization in an aqueous medium to produce core particles, (2) recovering the core particles from the aqueous medium, (3) drying the core particles to produce dried core particles, (4) dispersing the dried core particles in an organic solvent, (5) adding an organo-lithium compound to the dried core particles in the organic solvent to produce the hairless core initiator, (6) utilizing the hairless core initiator to initiate the anionic polymerization of a conjugated diolefin monomer in an organic solvent to produce a solution of the hairy polymer particles, and (7) recovering the hairy polymer particles from the organic solvent.

The present invention further reveals a rubber composition which is comprised of a rubbery polymer and a hairy polymer particle, wherein the hairy polymer particle is comprised of (1) a core which is comprised of a polymer of a vinyl aromatic monomer and (2) hairs which are polymer chains of a conjugated diolefin monomer, wherein the hairs are covalently bonded to the core.

The subject invention also discloses a process for making a rubber composition which comprises the steps of (1) polymerizing a vinyl aromatic monomer by emulsion polymerization in an aqueous medium to produce core particles, (2) recovering the core particles from the aqueous medium, (3) drying the core particles to produce dried core particles, (4) dispersing the dried core particles in an organic solvent, (5) adding an organo-lithium compound to the dried core particles in the organic solvent to produce the hairless core initiator, (6) utilizing the hairless core initiator to initiate the anionic polymerization of a conjugated diolefin monomer in an organic solvent to produce a solution of the hairy polymer particles, (7) blending the solution of the hairy polymer particles with the cement of a rubbery polymer to produce a cement blend, and (8) coagulating the cement blend to recover the rubber composition.

The present invention further reveals a hairy polymer particle which is comprised of (1) a core which is comprised of a polymer of a conjugated diolefin monomer and (2) hairs which are comprised of polymer chains of a vinyl aromatic monomer, wherein the hairs are covalently bonded to the core.

DETAILED DESCRIPTION OF THE INVENTION

Figure 1:
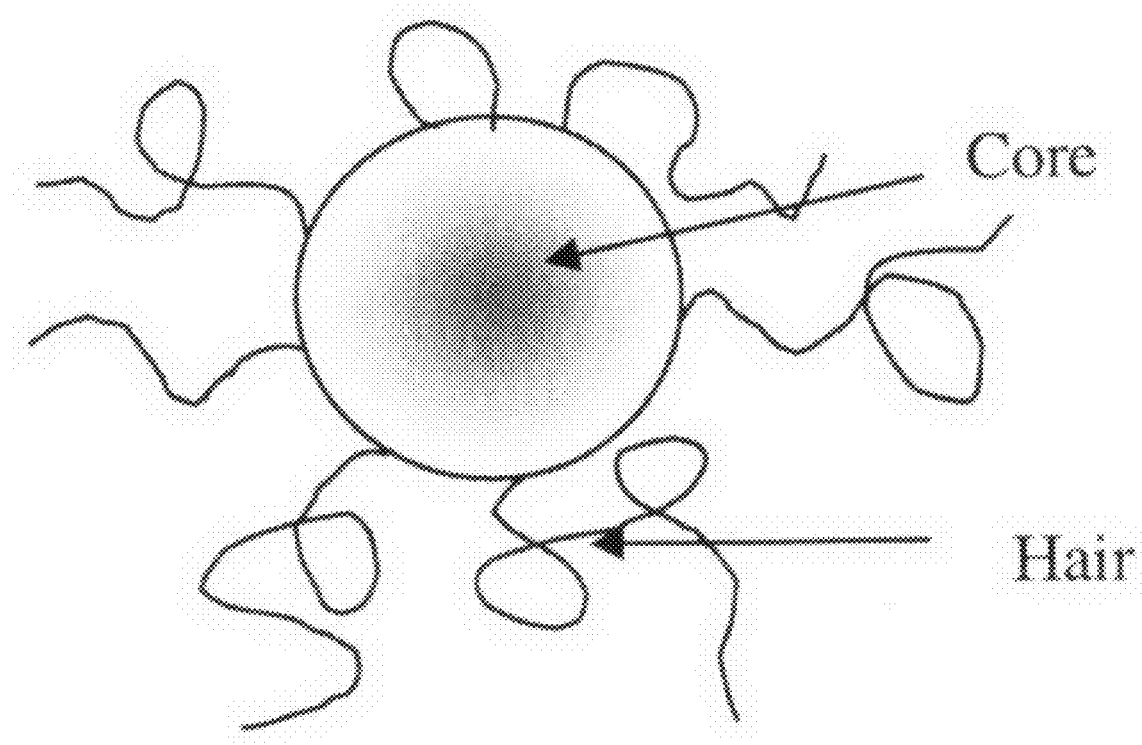
FIG. 1 is a schematic diagram of a hairy polymer particle of this invention.

The hairy polymer particles of this invention are synthesized by making a core polymer by emulsion polymerization. The core polymer is then recovered from the aqueous polymerization medium and dried to remove residual water from the aqueous polymerization medium. After being dried the core polymer is reacted with an organo-lithium compound to make a hairless core initiator. The hairless core initiator can then be used to initiate the anionic polymerization of conjugated diolefin monomers to produce the hairy polymer particles of this invention.

The polymer core particles are synthesized by the emulsion polymerization of vinyl aromatic monomers, and optionally, conjugated diolefin monomers. Generally, any vinyl aromatic monomer which is known to polymerize with free radical initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 2-methylstyrene, 3-methylstyrene, 4-methylstyrene, α-methyl styrene, 2,4-dimethylstyrene, 2,4-diisopropylstyrene, 4-tert-butylstyrene, 1-vinylnaphthalene, 2-vinylnaphthalene, α-methylstyrene, 4-phenylstyrene, 3-methylstyrene and the like. The conjugated diolefin monomers that can optionally be included in synthesizing the core polymer typically contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in mixture. The choice of monomers and ratio of vinyl aromatic monomers to conjugated diolefin monomer used in making the core polymer will depend upon the properties desired for the hairy polymer particles being made.

The core particles will typically be crosslinked using a crosslinking monomer unit such as divinyl benzene, diisopropenylbenzene, or 1,2-polybutadiene. The crosslinking monomer will typically be incorporated at a level which is within the range of 0% to about 100%, preferably about 10% to about 30%, by weight based upon the weight of the polymer. Crosslinking the particle can increase the hardness of the core, as well as enhance the uniformity and permanence of the shape and size of the resultant nanoparticle. The polymer of the core particles can also be crosslinked with one or more peroxygen, azo compounds or redox initiators as are subsequently described herein or through the use of a sulfur-based cure system including dimercapto and polymercapto compounds such as dimercaptoethane, 1,6-dimercaptohexane, 1,3,5-trimercaptotriazine, and mercapto-terminating polysulphide rubbers, such as mercapto-terminating reaction products of bis-chloroethyl formal with sodium polysulphide. The optimal temperature for the cross-linking operation is dependent on the reactivity of the cross-linking agent and may be from room temperature up to approximately 170° C.

The emulsion polymerization is conducted as a batch, semi-continuous, or continuous operation. Essentially any type of free radical generator can be used to initiate the free radical emulsion polymerization. For example, free radical generating chemical compounds, ultra-violet light or radiation can be used. In order to ensure a satisfactory polymerization rate, uniformity and a controllable polymerization, free radical generating chemical agents which are water-soluble or oil-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Persulfate initiators, such as potassium persulfate and ammonium persulfate, are especially useful in such aqueous emulsion polymerizations.

The rubbery polymers of this invention can also be synthesized with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisiobutyronitrile (AIBN), are preferred for use in generating free radicals.

The amount of free radical initiator employed will vary with the desired molecular weight of the core particle being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium. A chain transfer agent, such as t-dodecyl mercaptan, can optionally be used to reduce the molecular weight of the polymer synthesized during the emulsion polymerization used to make the polymeric core. For instance, the molecular weight of the core polymer reduces with increasing levels of chain transfer agent. However, it is not necessary to utilize a chain transfer agent in the synthesis of the core polymer.

In batch operations, the polymerization time can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor system of any suitable design. The polymerization reactions in such cases are suitably adjusted by varying the residence time. Residence times vary with the type of reactor system and the size of the reactors, for example, from 10 to 15 minutes to 24 or more hours.

Conventional emulsion recipes may also be employed with the present invention; however, some restrictions and modifications may arise either from the polymerizable monomer itself, or the polymerization parameters. Ionic surfactants, known in the art, including sulfonate detergents and carboxylate, sulfate, and phosphate soaps are useful in this invention. The level of ionic surfactant is computed based upon the total weight of the organic components and may range from about 2 to 30 parts by weight of ionic surfactant per 100 parts by weight of organic components.

The soap systems used in the emulsion polymerization process will frequently contain a combination of rosin acid and fatty acid emulsifiers. The weight ratio of fatty acid soaps to rosin acid soaps will typically be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is typically charged into the first polymerization zone. The total amount of soap employed will normally be less than 5 phm. The quantity of soap employed will normally be within the range of about 1 phm to 4 phm. It is typically preferred to utilize a level of soap which is within the range of about 2 phm to about 3.0 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature which is within the range of about 35° F. (2° C.) to about 100° F. (38° C.). It is generally preferred for the polymerization to be carried out at a temperature which is within the range of 40° F. (4° C.) to about 60° F. (16° C.). It is typically more preferred to utilize a polymerization temperature which is within the range of about 45° F. (7° C.) to about 55° F. (13° C.). To increase conversion levels, it can be advantageous to increase the temperature as the polymerization proceeds.

After the polymerization has been terminated the core polymer is recovered from the aqueous medium. This can be accomplished by coagulating the latex and recovering the core polymer from the aqueous medium. The coagulation can be accomplished by adding an acid or preferably a combination of salts and an acid to the emulsion. Following the initial coagulation, the core polymer may be washed one or multiple times with water or a water/alcohol solution.

After the core polymer particle is recovered from the emulsion, it will be dried to remove residual water from the aqueous polymerization medium. This will typically be done by heating the core polymer in a stream of warm dry air or by heating the core polymer under vacuum to remove any water present.

After being dried the core polymer is dispersed in an inert organic solvent. The organic solvent will typically be one or more of aliphatic hydrocarbons or aromatic hydrocarbons, such as pentane, hexane, heptane, octane, nonane, decane or cyclic hydrocarbons, such as cyclohexane, methyl cyclohexane, cyclooctane, cyclopentane, cyclopentane, cycloheptane, cyclononane, cyclodecane, benzene, toluene, ethyl benzene and mixtures thereof.

The core polymer can also be recovered from the emulsion by displacing the aqueous medium with a solvent that is soluble in both water and hydrocarbon solvents. Some representative examples of solvents that can be used for this purpose include acetone, ethanol, and isopropyl alcohol. Then the solvent that is soluble in both water and hydrocarbon solvents is displaced with an inert organic solvent. This technique removes water from the core polymer and produces a dispersion of the "dried" core polymer in the inert organic solvent.

An organo-lithium compound is added to the solution containing the core polymer. Some representative examples of organo-lithium catalysts that can be used include lithium compounds having the formula $R(Li)_x$, wherein R represents a $C_1$-$C_{20}$ hydrocarbyl radical, preferably a $C_2$-$C_8$ hydrocarbyl radical and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, and the like. Specific examples of exemplary initiators include ethyllithium, propyllithium, n-butyllithium, sec-butyllithium, tert-butyllithium, and the like; aryllithiums, such as phenyllithium, tolyllithium, and the like; alkenyllithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred. Specific examples of other suitable lithium inititators include one or more of: p-tolyl-lithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

The organo-lithium compound reacts with the core polymer to make a hairless core initiator. The hairless core initiator can then be used to initiate the anionic polymerization of other monomers. In the practice of this invention, additional monomers are polymerized with the hairless core initiator to produce polymer chains of the additional monomers that grow from the core initiator. This is accomplished by adding the additional monomers to the solution of the hairless core initiator or by adding the solution of the hairless core initiator to a polymerization medium containing the additional monomers. The monomers utilized in making the hairs (brushes) can be vinyl aromatic monomers, conjugated diolefin monomers, and/or other monomers that are copolymerizable therewith. For instance, hairs that are comprised of conjugated diolefin monomers can be polymerized onto a hard polystyrene/divinylbenzene core particle to make it compatible with rubbery elastomers. In any case, the polymeric hairs (brushes) can be prepared from aromatic vinyl monomers and conjugated diene monomers by this anionic polymerization technique. The resulting hairy polymer particles provide a controlled structure, size, and morphology which is very useful in composite materials, such as fillers to enhance the properties of rubbery polymers. The cores of these particles can be crosslinked, and the hairs are grafted by covalent bonds unto the backbones of the polymer chains making up the cores of the particles.

The anionic polymerization used to grow the hairs onto the core particles can be conducted in the presence of suitable modifiers for organo-lithium initiated anionic polymerizations including N,N,N',N'-tetramethylethylene diamine (TMEDA), hexamethylphosphoric acid triamide, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier lithium can vary from a minimum as low as 0 to a maximum as great as about 100, preferably about 0.5 to 10.

The hairs are polymer chains that can be comprised totally of conjugated diene units, such as 1,3-butadiene, 2,3-dimethyl-1,3-butadiene or isoprene, or could be a copolymer of a conjugated diene units and aromatic vinyl units, such as styrene-butadiene rubber (SBR). The SBR will typically contain from about 5 weight percent to about 45 weight percent styrene and from about 55 weight percent to about 95 weight percent 1,3-butadiene. The SBR will more typically contain from about 15 weight percent to about 30 weight percent styrene and from about 70 weight percent to about 85 weight percent 1,3-butadiene. In many cases the SBR will be a random copolymer that contains about 23.5% by weight of styrene and about 76.5% by weight 1,3-butadiene.

The polymeric particle of the present invention will have a diameter of less than about 1000 nm, and preferably less than about 500 nm. Particles in the range of about 50 nm to 240 nm are preferred, and sizes of less than 100 nm are most preferred. The particles are considered to be essentially spherical, although shape is not critical and shape defects are acceptable.

The polymer chains making up the hairs typically have a number average molecular weight which is within the range of 2,000 to about 250,000. These polymer chains will more typically have a number average molecular weight which is within the range of 3,000 to 100,000, and will preferably have a molecular weight which is within the range of 5,000 to 75,000. The polymer chains comprising the hairs will more preferably have a number average molecular weight which is within the range of 7,000 to 50,000. The number of hairs (polymer chains) that are bonded per $nm^2$ to the surface of the core is referred to as the hair density. The hair density will typically be within the range of 0.01 to 5 chains per $nm^2$ of the surface of the core. The hair density will preferably be within the range of 0.05 to 1 chains per $nm^2$ and will more preferably be within the range of 0.1 to 0.3 chains per $nm^2$.

By this process, it is possible to create polymeric particles with hairs, where the brushes are grafted to the polymeric particles covalently. Thus, the process can produce nanoparticles having a particle center with a surface layer of brushes and a mean average diameter of less than about 100 nm. The polymer particles with brushes can be recovered separately as reinforcing fillers and blended into the matrix polymer or as suspended particles which are blended with a rubber cement.

The hairy polymer particles can be incorporated in a non-crosslinked host or matrix polymer where the non-crosslinked host polymer can be a polymer having only conjugated diene repeat units, a polymer having repeat units of a conjugated diene unit and an aromatic vinyl unit, a polymer having repeat units of a conjugated diene unit and an α-β-unsaturated nitrile unit, an acrylic rubber, a polymer having repeat units of an ethylene unit, and polymers having repeat units having functional groups able to interact with at least one functional group of the hairy polymer particles. Thus, the particles of the present invention are suitable for incorporation in and modifying a variety of rubbers, including, but not limited to, random styrene-butadiene rubber (SBR) polybutadiene rubber, synthetic polyisoprene rubber, nitrile rubber, polyurethane, butyl rubber, EPDM, natural rubber, and the like.

The hairy particles of this invention will typically be incorporated in rubbery polymers at a level which is within the range of about 5 phr (parts by weight per 100 parts by weight of the rubber) to about 100 phr. The hairy particles will more typically be utilized at levels which are within the range of 10 m phr to 60 phr. The hairy polymer particles of this invention can be used in conjunction with conventional rubber compounding chemicals and in conjunction with conventional fillers, such as carbon black, silica, and/or starch.

In one embodiment of this invention, the hairy polymeric nanoparticles are incorporated into rubbery polymers by a technique that involves (1) blending the solution of the hairy polymer particles made by the process of this invention with the cement of a rubbery polymer to produce a cement blend, and (2) coagulating the cement blend to recover the rubber composition. The utilization of this technique can further improve the level of incorporation and interaction between the hairy nanoparticles and the rubbery polymer. This can accordingly further improve the physical properties of the rubber composition.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

In a preferred embodiment of the invention, the particles have a styrene center and polybutadiene brushes attached to the particle. The butadiene brush should provide better interaction and dispersion of the particles in diene-based polymers leading to improved compounding properties.

Example 1

Preparation of Crosslinked Polystyrene Particle

A glass quart bottle with a rubber septum and Teflon liner was charged with a soap solution composed of 423.80 grams of reverse osmosis (RO) water, 0.58 grams of tripotassium phosphate, 65.25 grams of a 10% solution of C14-18 unsaturated fatty acid potassium salt, 5.44 grams of a 20% solution of the potassium salt of disproportionated rosin acid, 1.19 grams of a 47.5% active dispersion of sodium naphthalene-sulfonate-formaldehyde. The pH of the soap solution was adjusted to 10.5-11.0 with a 20% potassium hydroxide solution.

To the bottle was added 10.13 grams of an activator solution composed of 10 grams of RO water, 0.10 grams of hydroxymethane-sulfinic acid monosodium salt dihydrate, and 0.03 grams of ethylenediaminetetraacetic acid, ferric sodium complex.

Then, 181.82 grams of styrene and 68.18 grams of 55% divinyl benzene were then added to the bottle and the mixture was purged with nitrogen gas for 3 minutes to remove oxygen. The bottle was sealed. The sealed bottle was placed in a 10° C. water bath and rotated at 20 revolutions per minute. When the contents of the bottle reached the bath temperature, 0.23 grams of a 44% active pinane hydroperoxide was added. The reaction was allowed to proceed until the solids content reached a plateau of 30% solids. The particle size was determined by light scattering and fit to a Gaussian distribution. The particle sizes determined were; Intensity Weight average 55±15 nm, Volume Weight average 44±12 nm, and Number Weight average 34±10 mm.

The coagulation and isolation of the polymer particles were performed by adding 15 grams of NaCl to 5 lbs (2.27 kg) of RO water. The pH of the solution was lowered to between 3 and 4 with an 18% sulfuric acid solution. The latex was slowly added to the coagulation solution under rapid stirring. During the addition of latex, the pH was maintained between 3 and 4. After coagulation the crumb polymer was washed 3 times with RO water and placed in a 65° C. oven with circulating air to dry. It was further dried under vacuum at 70° C. for 24 hours to remove residue water.

Example 2

Preparation of Polybutadiene Brushes on PS Particles

In this experiment, 50 grams of dry polystyrene cores and 500 ml hexanes were charged to a glass 1 quart (946 ml) bottle with a rubber septum and Teflon liner. The suspended solution was sonicated for 30 minutes using a 600 Watts sonicator with a 10 inch (25.4 cm) wave extender. The sonication broke apart the aggregates of polystyrene particles. The solution was then purged with nitrogen for about 30 minutes and sealed with septum.

Figure 2:
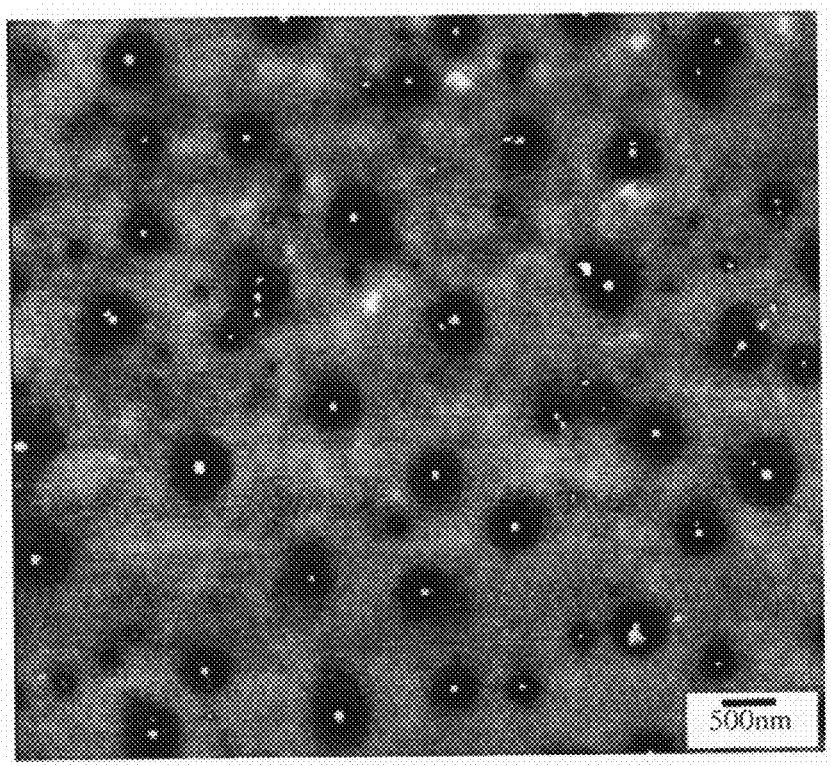
FIG. 2 is an atomic force microscope image in tapping mode of the polystyrene particle with polybutadiene brushes of the present invention.
Figure 3:
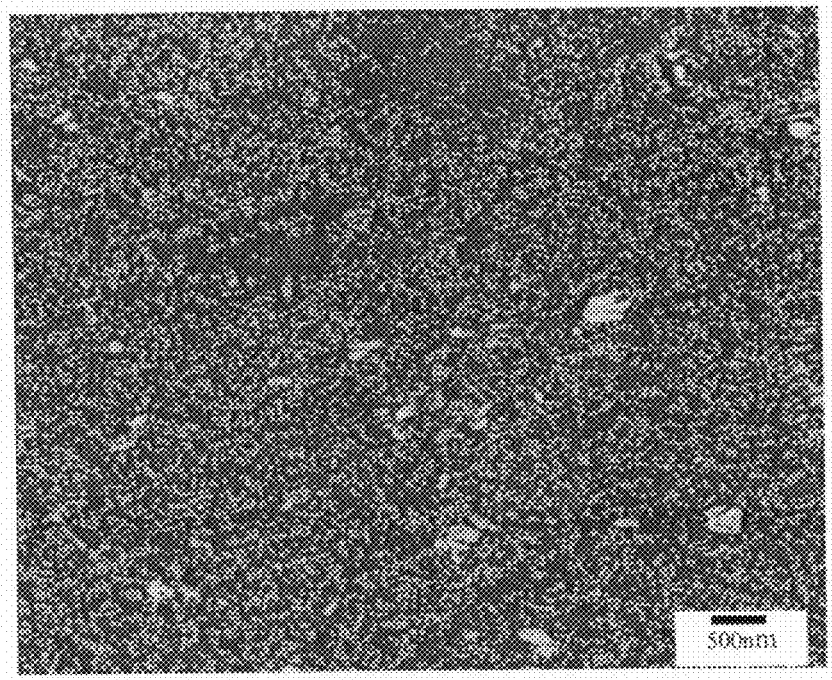
FIG. 3 is an atomic force microscope image in tapping mode of the particles dispersed in a PBd matrix.

Then, 10 ml of a 1.6 M n-butyllithium hexane solution and 1 ml of N,N,N',N'-tetramethylethylenediamine (TMEDA) was injected through the septum. The sealed bottle was placed in a 65° C. water bath and rotated at 20 revolutions per minute for 30 minutes. The lithiated polystyrene particles showed an orange color. Butadiene in hexanes was then introduced and the bottle continued to heat in the water bath until the full conversion of butadiene was attained. The reaction was stopped by injection of isopropanol and then 1% butylated hydroxytoluene (BHT) was added. The polymers were dried in an oven. The AFM image of this particle is shown in FIG. 2. The molecular weight of the hairs was determined on residue homopolymers extracted using hexanes.

Example 3

Preparation of the Compounded Mixture

Mixing of the particle/polymer blends was accomplished in two stages. The first stage (Non-productive) involved adding half of the particle/polymer blend to a 55 cc Haake Rheomix 90 equipped with a throat, with all the temperature control zones set at 145° C., Banbury rotors, and a mixing rate of 50 rpm. After the first half of the blend is added to the mixer the other ingredients of the Non-productive are added. As soon as the Non-productive ingredients were added, the second half of the blend was added in order to clear the throat of any remaining material. The ram was lowered and the material was mixed for 6 minutes ensuring that the temperature did not exceed 170° C.

The productive mix was run under the same conditions except that the temperature zones of the mixer were controlled at 100° C. One-half of the mixed Non-productive material was added to the mixer followed by the productive ingredients, and the second half of the Non-productive. The ram was lowered and the material was mixed for 3 minutes with the temperature not to exceed 115° C.

After the Productive mix was completed, the samples were passed six times endwise through a mill set at 0.032 in. in order to create a sheet.

Example 4

Compounded Properties

The polystyrene particle with polybutadiene brushes (PS/PBd#1) was prepared according to methods described in Examples 1 and 2. The PBd was grafted to styrene using butyllithium reacting with residue groups from divinylbenzene. The particle is composed of 92 wt % crosslinked PS and 8 wt % PBd. The molecular weight of the PBd is 35K. The Example A in Table 1 clearly indicates the PS/PBd#1 according to the invention significant improved tensile properties compared with the one without brushes (Comp Ex. 2). It also shows that the particles with brushes can be used as reinforcing fillers for rubbery materials to improve modulus, strength and elongation compared with the raw rubber (Comp. Ex. 1).

TABLE 1

|   | Comp. Ex. 1 | Comp. Ex. 2 | Ex. A |
|---|---|---|---|
| Budene ® 1209 | 100 | 100 | 100 |
| Filler (PS) | 0 | 60 | 0 |
| Filler (PS/PBd#1) | 0 | 0 | 60 |
| Stearic Acid | 2 | 2 | 2 |
| Zinc Oxide | 3 | 3 | 3 |
| Non-Productive* | 105 | 165 | 165 |
| TBBS* | 0.9 | 0.9 | 0.9 |
| Sulfur | 1.5 | 1.5 | 1.5 |
| Productive* | 107.4 | 167.4 | 167.4 |
| Tensile |   |   |   |
| 100% Modulus (psi) | 163 | 307 | 330 |
| 200% Modulus (psi) | 154 | 447 | 555 |
| 300% Modulus (psi) | — | 605 | 789 |
| Maximum Strain (%) | 354 | 515 | 658 |
| Strength (psi) | 256 | 981 | 1922 |

*Non-productive is the compounded material without any curative agents added. The material may be heated and mixed to higher temperatures without beginning the vulcanization process. Productive is the non-productive material with the curative added. The material may now be cured (vulcanized) with heat.
TBBS: N-t-butylbenzothiazole-2-sulfenamide.

A series of compounds were made containing 60 phr PS particle centers with different length of brushes in Examples B to E to evaluate the correlation between an increase molecular weight of the brushes on the particles and material properties (Table 2). The particle was treated as non-reactive to sulfur cure polystyrene and reactive to sulfur cure polybutadiene brushes so that each composition was considered to contain 100 parts rubber and the amount of curatives used were adjusted accordingly. The investigation intended to show that molecular weight of the brushes has important influence on the strain and strength of the materials. A critical molecular weight may be necessary to achieve desirable properties.

TABLE 2

|   | Ex. B | Ex. C | Ex. D | Ex. E |
|---|---|---|---|---|
| Budene ® 1209 | 92.8 | 90.4 | 83.2 | 72.4 |
| Filler (PS/PBd#2) | 67.2 | 0 | 0 | 0 |
| Filler (PS/PBd#3) | 0 | 69.6 | 0 | 0 |
| Filler (PS/PBd#4) | 0 | 0 | 76.8 | 0 |
| Filler (PS/PBd#5) | 0 | 0 | 0 | 87.6 |
| Stearic Acid | 2 | 2 | 2 | 2 |
| Zinc Oxide | 3 | 3 | 3 | 3 |
| Non-Productive | 165 | 165 | 165 | 165 |
| TBBS | 0.9 | 0.9 | 0.9 | 0.9 |
| Sulfur | 1.5 | 1.5 | 1.5 | 1.5 |
| Productive | 167.4 | 167.4 | 167.4 | 167.4 |
| Mn of PBd Brushes | 1.8K | 3.7K | 7.1K | 10.2K |
| Hair Density (#chains/nm$^2$) | 0.14 | 0.14 | 0.13 | 0.15 |
| Tensile |   |   |   |   |
| 100% Modulus (psi) | 317 | 286 | 284 | 306 |
| 200% Modulus (psi) | 507 | 455 | 420 | 427 |
| 300% Modulus (psi) | — | 631 | 577 | 577 |
| Maximum Strain (%) | 372 | 466 | 571 | 640 |
| Strength (psi) | 728 | 834 | 1021 | 1251 |

The next set of experiments will show the change of grafting density, which is the amount of chains per particle, results in the change of properties. Examples E, F and G have the same amount of PBd hairs and decreasing amount of graft density, and thus increasing molecular weight. It is clear that tensile properties have changed with grafting density. The AFM images also show the particle start to aggregate more and more when the grafting density decreased. The attachment of the polybutadiene hairs to the polystyrene particle leads to a synergistic enhancement of the interactions between the non-crosslinked polymer matrix and the filler particle. This invention has shown that through fine tuning the molecular weight and grafting density of the brushes, the mechanical properties can be changed.

TABLE 3

|   | Ex. E | Ex. F | Ex. G |
|---|---|---|---|
| Budene ® 1209 | 72.4 | 74.8 | 72.4 |
| Filler (PS/PBd#5) | 87.6 | 0 | 0 |
| Filler (PS/PBd#6) | 0 | 85.2 | 0 |
| Filler (PS/PBd#7) | 0 | 0 | 87.6 |
| Stearic Acid | 2 | 2 | 2 |
| Zinc Oxide | 3 | 3 | 3 |
| Non-Productive | 165 | 165 | 165 |
| TBBS | 0.9 | 0.9 | 0.9 |
| Sulfur | 1.5 | 1.5 | 1.5 |
| Productive | 167.4 | 167.4 | 167.4 |
| Mn of PBd Brushes | 10K | 18K | >18K |
| Hair Density (#chains/nm$^2$) | 0.15 | 0.08 | <0.08 |
| Tensile |   |   |   |
| 100% Modulus (psi) | 306 | 458 | 522 |
| 200% Modulus (psi) | 427 | 672 | 746 |
| 300% Modulus (psi) | 577 | 896 | 972 |
| Maximum Strain (%) | 640 | 379 | 460 |
| Strength (psi) | 1251 | 1044 | 1367 |

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which would be within the full-intended scope of the invention as defined by the following appended claims.

What is claimed is:

1. A process for synthesizing a hairy polymer particle which comprises polymerizing a conjugated diolefin monomer by anionic polymerization in an organic solvent, wherein the anionic polymerization is initiated with a hairless core initiator which is made by the steps of (1) polymerizing a vinyl aromatic monomer by emulsion polymerization in an aqueous medium to produce core particles, wherein the emulsion polymerization is initiated with a free radical generator, (2) recovering the core particles from the aqueous medium, (3) dispersing the core particles in an organic solvent, and (4) adding an organo-lithium compound to the core particles in the organic solvent to produce the hairless core initiator.

2. A process as specified in claim 1 which further comprises recovering the hairy polymer particles from the organic solvent.

3. A process as specified in claim 1 wherein the core particles are dried after being recovered from the aqueous medium.

4. A process as specified in claim 1 wherein the conjugated diolefin monomer is 1,3-butadiene.

5. A process as specified in claim 1 wherein the conjugated diolefin monomer is isoprene.

6. A process as specified in claim 1 wherein the vinyl aromatic monomer contains from 8 to 20 carbon atoms.

7. A process as specified in claim 1 wherein the vinyl aromatic monomer contains from 8 to 14 carbon atoms.

8. A process as specified in claim 1 wherein the vinyl aromatic monomer is styrene.

9. A process as specified in claim 1 wherein the vinyl aromatic monomer is α-methylstyrene.

10. A process as specified in claim 1 wherein the free radical generator is a peroxygen compound.

11. A process as specified in claim 10 wherein the peroxygen compound is selected from the group consisting of potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, and acetyl cyclohexyl sulfonyl peroxide.

12. A process as specified in claim 10 wherein the free radical generator is a potassium persulfate.

13. A process as specified in claim 10 wherein the free radical generator is a ammonium persulfate.

14. A process as specified in claim 1 wherein the organo-lithium compound is of the formula $R(Li)_x$, wherein R represents a hydrocarbyl radical that contains from 1 to 20 carbon atoms.

15. A process as specified in claim 14 wherein the hydrocarbyl radical contains from 1 to 4 carbon atoms.

16. A process as specified in claim 14 wherein the organo-lithium compound is selected from the group consisting of ethyllithium, n-propyllithium, isopropyllithium, n-butyllithium, isobutyllithium, t-butyllithium, n-butyllithium, sec-butyllithium, tert-butyllithium, phenyllithium, p-tolyllithium, 4-phenylbutyl lithium, 4-butylcyclohexyl lithium, and 4-cyclohexylbutyl lithium.

17. A process as specified in claim 14 wherein the organo-lithium compound is n-butyllithium.

18. A process as specified in claim 3 wherein the core particles are dried by heating the core particles in a stream of warm dry air.

19. A process for making a rubber composition which comprises (1) blending the solution of the hairy polymer particles made by the process specified in claim 1 with the cement of a rubbery polymer to produce a cement blend, and (2) coagulating the cement blend to recover the rubber composition.

20. A process as specified in claim 19 wherein the rubbery polymer is styrene-butadiene rubber.

* * * * *